(No Model.) 2 Sheets—Sheet 1.
C. N. OWEN.
SWATHING ATTACHMENT FOR HARVESTERS.
No. 383,317. Patented May 22, 1888.
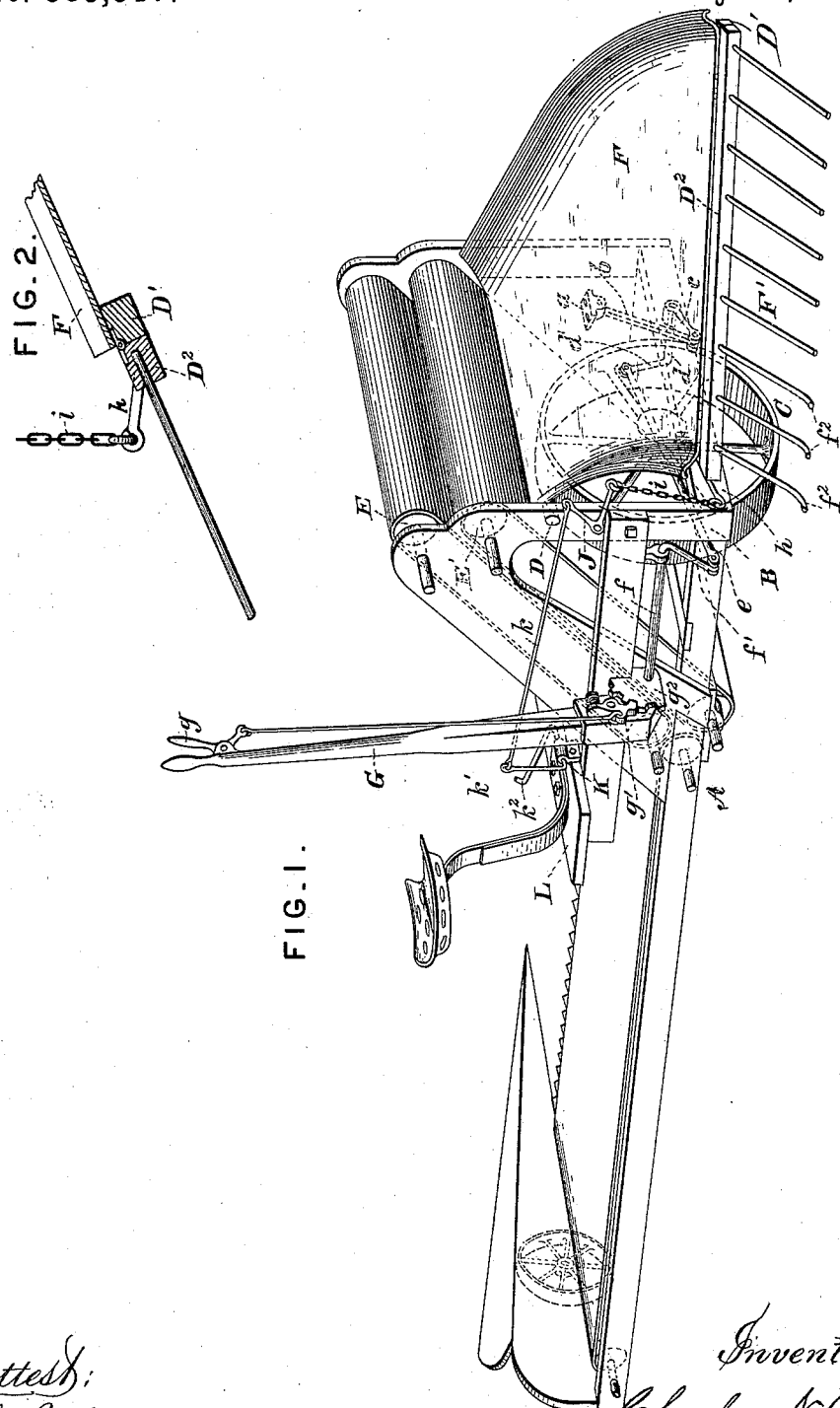

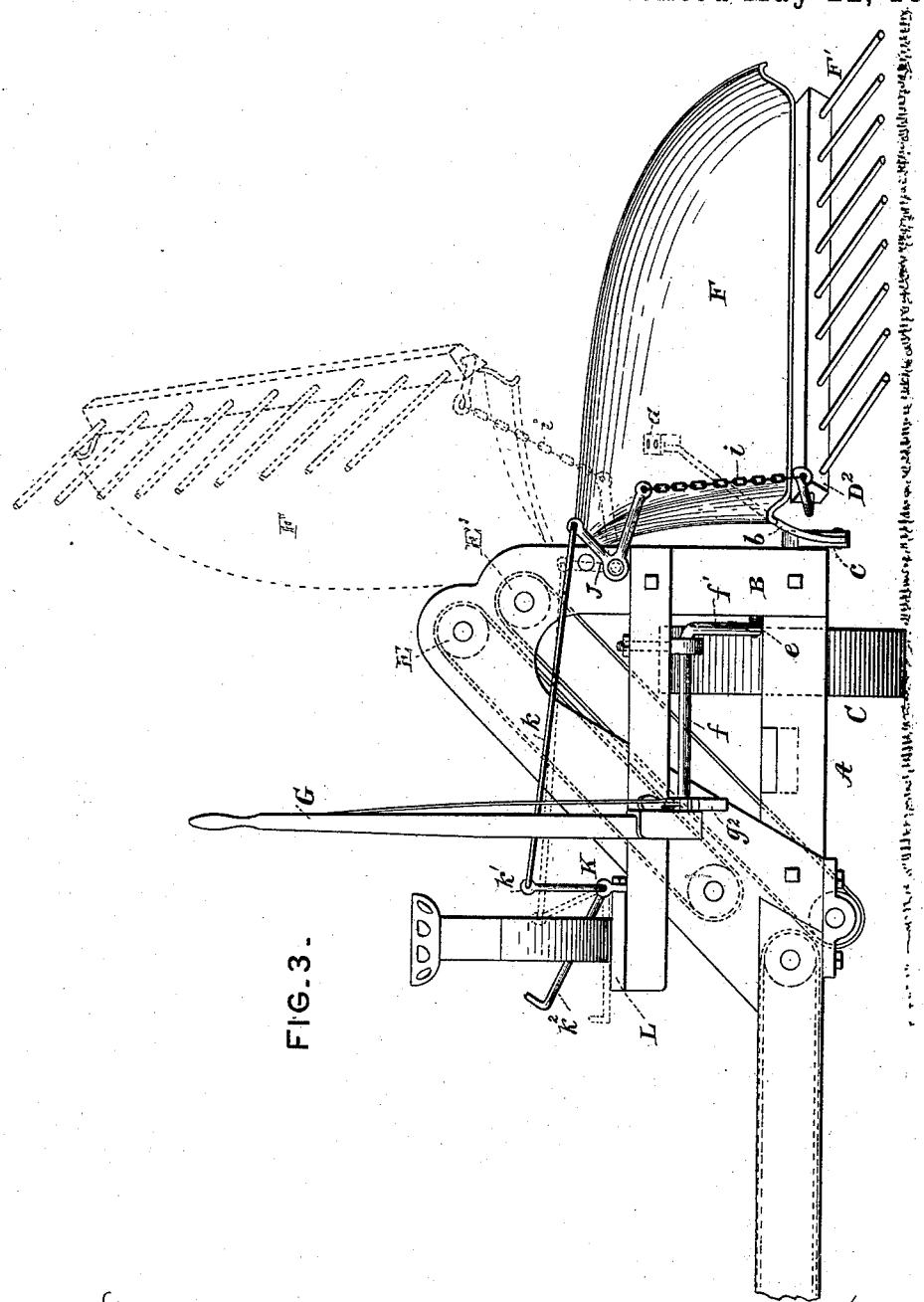

UNITED STATES PATENT OFFICE.

CHARLES N. OWEN, OF MECHANICSBURG, PENNSYLVANIA.

SWATHING ATTACHMENT FOR HARVESTERS.

SPECIFICATION forming part of Letters Patent No. 383,317, dated May 22, 1888.

Application filed September 28, 1887. Serial No. 250,876. (No model.)

*To all whom it may concern:*

Be it known that I, CHARLES N. OWEN, of Mechanicsburg, county of Cumberland, State of Pennsylvania, have invented a new and useful Improvement in Swathing Attachments for Harvesters, of which the following is a full, clear, and exact description, reference being had to the accompanying drawings, making part of this specification.

My invention relates to an improvement upon the swathing attachment upon which Letters Patent No. 251,845 were granted; and it consists, first, in pivoting or hinging the swathing attachment or inclined chute to the harvester or elevator frame, whereby it is adapted to be adjusted to suit the kind or condition of grain to be operated upon, for passing over obstructions in its path, and to be folded over against the machine for transportation, and to the combination with the hinged swathing device of means for enabling the driver to effect its adjustment while the machine is at work, as hereinafter described and claimed.

It further consists in the combination, with the swathing device, of a stop or cut-off for enabling the driver to suspend the operation of depositing the grain in a swath when the machine is turning a corner, for the purpose of preventing the trampling and thrashing out of the grain by the team and machine on the succeeding round.

It further consists in certain details of construction and arrangement of parts for improving the operation of the swathing device, all as hereinafter described and claimed.

In the accompanying drawings, Figure 1 is a perspective view looking from the rear stubble side of a harvester-machine with my improved swathing device attached. Fig. 2 represents a section through the outer rear end of the swathing chute and the hinged bar to which the delivery-fingers are attached; and Fig. 3 shows the swathing attachment, grain-elevator, and drive-wheel side of the machine in rear elevation.

A indicates the main frame of the machine, B the elevator-frame, C the drive-wheel, and E E' the upper rollers of the elevator-aprons, said parts being of the usual or any preferred construction and arrangement.

D indicates the upper longitudinal bar or frame-piece of the swathing device or chute, similar in location or arrangement to the corresponding bar in the patent referred to, but pivoted at its ends in the upright bars of the elevator-frame, as shown in Figs. 1 and 3; and F is the inclined spiral-shaped chute or swathing device secured rigidly at its upper end to the pivoted longitudinal bar or rock-shaft D. This chute is inclined downward and curved rearward from its point of attachment to the bar D, and may be constructed either of metal or wood, or both, as preferred. At its lower discharging end the chute is provided with a series of flexible fingers, F', which are preferably rigidly secured to the bar D², hinged to a lower bar, D', of the chute-frame.

For the purpose of raising the chute F for passing an obstruction, or for adjusting the angle of inclination of the chute to adapt it to the kind or condition of the grain to be operated upon, the chute has a bracket, $a$, secured to its lower face, to which a pendent link, $b$, is pivoted, the lower end of said link being attached to an arm, $c$, of a transversely-arranged rock-shaft, $d$, mounted in bearings in an outer longitudinal frame-bar, as shown in dotted lines in Fig. 1. The inner end of the shaft $d$ is provided with an upright arm, $d'$, from which a link, $e$, extends rearward, and has its outer end connected to a pendent arm, $f'$, of a transversely-arranged rock-shaft, $f$, mounted in suitable bearings on the main or elevator frame, as shown. The inner end of this rock-shaft $f$ has a lever, G, rigidly secured to it, said lever extending upward within convenient reach of the driver in his seat on the machine, for enabling him to adjust the chute as desired.

The lever G is provided with a thumb-lever, $g$, connected by a link with a latch, $g'$, adapted to engage a rack, $g^2$, on the frame, for holding the lever G, and with it the chute, at any desired adjustment.

For folding the chute up against the elevator for transportation, the pin connecting the link $b$ with the crank-arm $c$ may be removed, when the chute can be folded upward into the position indicated by dotted lines in Fig. 3.

The fingers F' may be rigidly secured to the lower frame-bar of the chute-frame; but as it is desirable to stop the swathing action in turning corners, in order to prevent the grain from being trampled on the succeeding round of the team, I prefer to attach said fingers to a bar, $D^2$, which is hinged to the lower rear bar, D', of the chute-frame and provided at its inner end with a crank-arm, $h$, from which a link or chain, $i$, extends upward, and has its upper end attached to the horizontal arm of a bell-crank, J, pivoted on the rear face of the frame, as shown.

A link, $k$, extends inward or grainward from the upright arm of this bell-crank, and has its inner end attached to an upright arm, $k'$, of a longitudinally-arranged rock-shaft, K, mounted in suitable bearings on the frame, or on the driver's foot-board, as shown. The forward end of the rock-shaft K is provided with a crank-arm or foot-lever, $k^2$, arranged within convenient reach of the driver's foot, and the driver, by pressing his foot on said lever, can rock the fingers F' upward into a position perpendicular, or nearly so, to the chute F, and thereby cause them to act as a cut-off for temporarily stopping the discharge of the grain while the machine is turning a corner of the field of grain. As soon as the machine has turned the corner, the driver, by removing his foot, allows the fingers to drop again to their operative position, and the swathing of the grain is resumed.

It is desired to deliver the grain upon the ground in a continuous swath, except at the corners, as explained, similar to that in which it is laid when the hand-cradle is used, with the stalks at right angles to the position they occupy on the platform-carrier; but in some conditions of the grain the heads of the stalks, owing to the steeper incline of the inner shorter curved side of the chute, might reach the ground first and so leave the stalks lying obliquely across the path of the swathing device. To remedy this, the fingers F' are made of flexible metal rods, and one, two, or more of those at the inner side can be bent upward, as indicated at $f^2$, and so made to slightly retard the deposition of said head ends on the ground, thereby giving the butts time to swing around into the desired position.

It will be apparent that the devices for effecting the adjustment of the chute or swathing device, and also the form of stop or cut-off for temporarily stopping the swathing operation while turning corners, can be varied without departing from my invention hereinabove described.

Having now described my invention, I claim as new and desire to secure by Letters Patent—

1. In a harvesting-machine, an adjustable inclined spiral chute or swathing device hinged to the outer stubble side of the machine, substantially as described.

2. The combination, with a harvesting-machine, of the inclined spiral chute or swathing device hinged to the stubble side of said machine, and means, substantially as described, for effecting the adjustment of said swathing device while the machine is in operation, for the purpose and substantially as described.

3. The combination, with the inclined spiral chute or swathing device hinged to the stubble side of the machine, as described, of an adjustable cut-off for temporarily stopping the operation of swathing the grain, substantially as described.

4. The combination, in a harvesting-machine, of the hinged swathing device or chute, the adjustable cut-off, and means, substantially as described, for independently adjusting both said chute and cut-off.

5. The inclined spiral chute or swathing device provided with the flexible fingers hinged to its discharging end, substantially as and for the purpose described.

6. The combination, with a hinged swathing device, of an adjustable cut-off having flexible delivery-fingers, and means, substantially as described, for independently adjusting both said swathing device and cut-off.

In testimony whereof I have hereunto set my hand.

CHARLES N. OWEN.

Witnesses:
J. C. RANKIN,
GEORGE W. OWEN.